(12) United States Patent
Isurugi et al.

(10) Patent No.: US 9,469,056 B2
(45) Date of Patent: Oct. 18, 2016

(54) MOLD, MOLD MANUFACTURING METHOD AND METHOD FOR MANUFACTURING ANTI-REFLECTION FILM USING THE MOLD

(71) Applicant: Sharp Kabushiki Kaisha, Osaka-shi, Osaka (JP)

(72) Inventors: Akinobu Isurugi, Osaka (JP); Kiyoshi Minoura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 405 days.

(21) Appl. No.: 14/212,636

(22) Filed: Mar. 14, 2014

(65) Prior Publication Data

US 2014/0197559 A1 Jul. 17, 2014

Related U.S. Application Data

(62) Division of application No. 13/138,256, filed as application No. PCT/JP2010/000358 on Jan. 22, 2010, now abandoned.

(30) Foreign Application Priority Data

Jan. 30, 2009 (JP) .................... 2009-019362

(51) Int. Cl.
*B29C 35/08* (2006.01)
*B29C 33/38* (2006.01)
*B29C 33/42* (2006.01)
(Continued)

(52) U.S. Cl.
CPC ....... *B29C 35/0805* (2013.01); *B29C 33/3828* (2013.01); *B29C 33/424* (2013.01); *B29C 33/62* (2013.01); *C25D 11/045* (2013.01);
(Continued)

(58) Field of Classification Search
CPC ............ B29C 33/3842; B29C 33/424; C25D 11/045
See application file for complete search history.

(56) References Cited

U.S. PATENT DOCUMENTS 4,190,321 A 2/1980 Dorer et al.
4,612,242 A 9/1986 Vesley et al.
(Continued)

FOREIGN PATENT DOCUMENTS

JP 53-103754 A 9/1978
JP 60-077317 A 5/1985
(Continued)

OTHER PUBLICATIONS

Kumagai et al. "Preparation of Molds for Nanoimprinting by Anodization of Al", Proceedings of the 68th Meeting of the Japan Society of Applied Physics, No. 2, Fall 2007, 5p-W-3.
(Continued)

*Primary Examiner* — James Sanders
(74) *Attorney, Agent, or Firm* — Harness, Dickey & Pierce, P.L.C.

(57) ABSTRACT

A mold of at least one embodiment of the present invention includes: a base; a conductive layer provided on the base; and an anodized film provided on the conductive layer, the anodized film having an inverted motheye structure in its surface, the inverted motheye structure having a plurality of recessed portions whose two-dimensional size viewed in a direction normal to the surface is not less than 10 nm and less than 500 nm, wherein the base, the conductive layer, and the anodized film are capable of transmitting ultraviolet light.

8 Claims, 8 Drawing Sheets

(51) Int. Cl.
*B29C 33/62* (2006.01)
*C25D 11/06* (2006.01)
*C25D 11/12* (2006.01)
*C25D 11/24* (2006.01)
*G02B 1/118* (2015.01)
*C25D 11/04* (2006.01)

(52) U.S. Cl.
CPC ............... *C25D 11/06* (2013.01); *C25D 11/12* (2013.01); *C25D 11/24* (2013.01); *G02B 1/118* (2013.01)

(56) References Cited

U.S. PATENT DOCUMENTS

| | | |
|---|---|---|
| 4,717,457 A | 1/1988 | van der Werf et al. |
| 5,002,838 A | 3/1991 | Yasue et al. |
| 5,665,846 A | 9/1997 | Sato et al. |
| 6,359,735 B1 | 3/2002 | Gombert et al. |
| 6,610,463 B1 | 8/2003 | Ohkura et al. |
| 7,066,234 B2 | 6/2006 | Sawitowski |
| 2007/0159698 A1 | 7/2007 | Taguchi et al. |

FOREIGN PATENT DOCUMENTS

| | | |
|---|---|---|
| JP | 2-057690 A | 2/1990 |
| JP | 2001-138300 A | 5/2001 |
| JP | 2001517319 A | 10/2001 |
| JP | 2003531962 A | 10/2003 |
| JP | 2005156695 A | 6/2005 |
| JP | 2007-307752 A | 11/2007 |
| JP | 2008-098532 A | 4/2008 |
| JP | 2008-197217 A | 8/2008 |
| JP | 2008-223073 A | 9/2008 |
| WO | WO-2006059686 A1 | 6/2006 |

OTHER PUBLICATIONS

International Search Report dated May 11, 2010.
International Preliminary Report on Patentability dated Aug. 18, 2011.

MOLD, MOLD MANUFACTURING METHOD AND METHOD FOR MANUFACTURING ANTI-REFLECTION FILM USING THE MOLD

This application is a divisional application of U.S. application Ser. No. 13/138,256, filed Jul. 25, 2011, which is a National Phase Application of PCT Application No. PCT/JP/2010000358, filed Jan. 22, 2010, which claims priority under U.S.C. §119 to Japanese Patent Application No. 2009-019362, filed on Jan. 30, 2009, in the Japanese Patent Office (JPO), the entire contents of each of which are incorporated herein by reference.

BACKGROUND OF THE INVENTION

1. Technical Field

The present invention relates to a mold, a method of fabricating a mold, and a method of fabricating an antireflection film using the mold. In this specification, the "mold" includes molds that are for use in various processing methods (stamping and casting), and is sometimes referred to as a stamper. The mold can also be used for printing (including nanoimprinting).

2. Background Art

Display devices for use in TVs, cell phones, etc., and optical elements, such as camera lenses, etc., usually adopt an antireflection technique in order to reduce the surface reflection and increase the amount of light transmitted therethrough. This is because, when light is transmitted through the interface between media of different refractive indices, e.g., when light is incident on the interface between air and glass, the amount of transmitted light decreases due to, for example, Fresnel reflection, thus deteriorating the visibility.

An antireflection technique which has been receiving attention in recent years is forming over a substrate surface a very small uneven pattern in which the interval of recessed portions or raised portions is not more than the wavelength of visible light ($\lambda$=380 nm to 780 nm). See Patent Documents 1 to 4. The two-dimensional size of a raised portion of an uneven pattern which performs an antireflection function is not less than 10 nm and less than 500 nm.

This method utilizes the principles of a so-called motheye structure. The refractive index for light that is incident on the substrate is continuously changed along the depth direction of the recessed portions or raised portions, from the refractive index of a medium on which the light is incident to the refractive index of the substrate, whereby reflection of a wavelength band that is subject to antireflection is prevented.

The motheye structure is advantageous in that it is capable of performing an antireflection function with small incident angle dependence over a wide wavelength band, as well as that it is applicable to a number of materials, and that an uneven pattern can be directly formed in a substrate. As such, a high-performance antireflection film (or antireflection surface) can be provided at a low cost.

As the method of forming a motheye structure, using an anodized porous alumina layer which is obtained by means of anodization of aluminum has been receiving attention (Patent Documents 2 to 4).

Now, the anodized porous alumina layer which is obtained by means of anodization of aluminum is briefly described. Conventionally, a method of forming a porous structure by means of anodization has been receiving attention as a simple method for making nanometer-scale micropores (very small recessed portions) in the shape of a circular column in a regular arrangement. An aluminum base is immersed in an acidic electrolytic solution of sulfuric acid, oxalic acid, phosphoric acid, or the like, or an alkaline electrolytic solution, and this is used as an anode in application of a voltage, which causes oxidation and dissolution. The oxidation and the dissolution concurrently advance over a surface of the aluminum base to form an oxide film which has micropores over its surface. The micropores, which are in the shape of a circular column, are oriented vertical to the oxide film and exhibit a self-organized regularity under certain conditions (voltage, electrolyte type, temperature, etc.). Thus, this anodized porous alumina layer is expected to be applied to a wide variety of functional materials.

A porous alumina layer prepared under specific conditions includes cells in the shape of a generally regular hexagon which are in a closest packed two-dimensional arrangement when seen in a direction perpendicular to the film surface. Each of the cells has a micropore at its center. The arrangement of the micropores is periodic. The cells are formed as a result of local dissolution and growth of a coating. The dissolution and growth of the coating concurrently advance at the bottom of the micropores which is referred to as a barrier layer. As known, the size of the cells, i.e., the interval between adjacent micropores (the distance between the centers), is approximately twice the thickness of the barrier layer, and is approximately proportional to the voltage that is applied during the anodization. It is also known that the diameter of the micropores depends on the type, concentration, temperature, etc., of the electrolytic solution but is, usually, about ⅓ of the size of the cells (the length of the longest diagonal of the cell when seen in a direction vertical to the film surface). Such micropores of the porous alumina may constitute an arrangement which has a high regularity (periodicity) under specific conditions, an arrangement with a regularity degraded to some extent depending on the conditions, or an irregular (non-periodic) arrangement.

Patent Document 2 discloses a method of producing an antireflection film (antireflection surface) with the use of a stamper which has an anodized porous alumina film over its surface.

Patent Document 3 discloses the technique of forming tapered recesses with continuously changing pore diameters by repeating anodization of aluminum and a pore diameter increasing process.

The present applicant discloses in Patent Document 4 the technique of forming an antireflection film with the use of an alumina layer in which very small recessed portions have stepped lateral surfaces.

As described in Patent Documents 1, 2, and 4, by providing an uneven structure (macro structure) which is greater than a motheye structure (micro structure) in addition to the motheye structure, the antireflection film (antireflection surface) can be provided with an antiglare function. The two-dimensional size of a raised portion of the uneven structure which is capable of performing the antiglare function is not less than 1 μm and less than 100 μm. The entire disclosures of Patent Documents 1, 2, and 4 are herein incorporated by reference.

Utilizing such an anodized porous aluminum film can facilitate the fabrication of a mold which is used for formation of a motheye structure over a surface (hereinafter, "motheye mold"). In particular, as described in Patent Documents 2 and 4, when the surface of the anodized aluminum film as formed is used as a mold without any modification, a large effect of reducing the manufacturing cost is achieved. The structure of the surface of a motheye mold which is capable of forming a motheye structure is herein referred to as "inverted motheye structure".

Non-patent Document 1 discloses a method of fabricating a mold for nanoimprinting which has light transmissivity. The light-transmitting mold is obtained by forming an anodized porous alumina film which has a predetermined structure on one of the surfaces of an aluminum plate and then thoroughly anodizing the remaining aluminum from the rear surface of the aluminum plate. A regular pattern of a UV-curable resin which is formed on a silicon substrate using the light-transmitting mold is disclosed. When the light-transmitting mold is used, the UV-curable resin can advantageously be irradiated with light through the mold.

CITATION LIST

Patent Literature

Patent Document 1: Japanese PCT National Phase Laid-Open Publication No. 2001-517319
Patent Document 2: Japanese PCT National Phase Laid-Open Publication No. 2003-531962
Patent Document 3: Japanese Laid-Open Patent Publication No. 2005-156695
Patent Document 4: WO 2006/059686

Non-Patent Literature

Non-patent Document 1: Proceedings of the 68th Meeting of the Japan Society of Applied Physics (2007 Fall), 5p-W-3

SUMMARY OF INVENTION

Technical Problem

However, the entire mold structure of the light-transmitting mold disclosed in Non-patent Document 1 is formed by an anodized porous alumina film, and both surfaces of the film have micropores. This leads to a problem that the mold is easily broken. Increasing the thickness of the mold in order to obtain sufficient mechanical strength leads to a problem that anodizing the entirety of the aluminum plate is difficult.

According to the method disclosed in Non-patent Document 1, an electrode is attached to an edge of an aluminum plate that is to be processed into a mold. Therefore, in fabrication of a large-surface mold, it is difficult to anodize the entirety of the aluminum plate. Since aluminum does not have light transmissivity, an intended light-transmitting mold cannot be obtained.

The method disclosed in Non-patent Document 1 includes the step of anodizing an aluminum plate from both sides and is therefore not applicable to an aluminum film formed on a base.

The present invention was conceived for the purpose of solving the above problems. Major objects of the present invention includes providing a method of fabricating a large-surface motheye mold which is capable of transmitting ultraviolet light and providing a motheye mold which is fabricated according to the fabrication method.

Solution to Problem

A mold of the present invention includes: a base; a conductive layer provided on the base; and an anodized film provided on the conductive layer, the anodized film having an inverted motheye structure in its surface, the inverted motheye structure having a plurality of recessed portions whose two-dimensional size viewed in a direction normal to the surface is not less than 10 nm and less than 500 nm, wherein the base, the conductive layer, and the anodized film are capable of transmitting ultraviolet light.

In one embodiment, the conductive layer is formed by a titanium film whose thickness is not more than 100 nm. The thickness of the titanium film is preferably not less than 1 nm.

In one embodiment, the mold further includes a mold release layer provided on the anodized film. The mold release layer may be, for example, a water-repellent resin layer.

In one embodiment, the anodized film has minute pores on a side of the plurality of recessed portions which is closer to the conductive layer, the minute pores being smaller than the plurality of recessed portions.

In one embodiment, the anodized film includes a porous alumina layer which has the inverted motheye structure in its surface and an alumina layer which does not have a minute pore (sometimes referred to as "barrier layer"), the alumina layer being provided on a side of the porous alumina layer which is closer to the conductive layer.

In one embodiment, a thickness of the alumina layer which does not have a minute pore is not less than 100 nm. The thickness of the alumina layer which does not have a minute pore is preferably not more than 400 nm.

A mold fabrication method of the present invention is a method of fabricating a mold that has an inverted motheye structure in its surface, the inverted motheye structure having a plurality of recessed portions whose two-dimensional size viewed in a direction normal to the surface is not less than 10 nm and less than 500 nm, the method including the steps of: (a) providing a base which is capable of transmitting ultraviolet light; (b) forming on the base a conductive layer which is capable of transmitting ultraviolet light; (c) depositing an aluminum film on the conductive layer; and (d) anodizing an entirety of the aluminum film, the step (d) including (d1) anodizing the aluminum film to form a porous alumina layer which has a plurality of very small recessed portions, (d2) after step (d1), bringing the porous alumina layer into contact with an etchant, thereby enlarging the plurality of very small recessed portions of the porous alumina layer, and (d3) after step (d2), further anodizing the aluminum film to grow the plurality of very small recessed portions.

In one embodiment, step (d) includes, after step (d3), further performing step (d2) and step (d3).

In one embodiment, step (d) further includes (da) forming the inverted motheye structure in a surface of the porous alumina layer through steps (d1) to (d3), and (db1) after step (da), further anodizing the aluminum film to form minute pores on a side of the porous alumina layer which is closer to the conductive layer, the minute pores being smaller than the plurality of recessed portions.

In one embodiment, the fabrication method further includes (db2) after step (db1), anodizing the aluminum film to form an alumina layer which does not have the minute pores on a side of the porous alumina layer which is closer to the conductive layer.

In one embodiment, step (db2) is performed in an electrolytic solution whose pH is more than 4.0 and not more than 7.0.

In one embodiment, the electrolytic solution used in step (db2) is an aqueous solution which contains at least one of acids or salts selected from a group consisting of tartaric acid, ammonium tartrate, potassium sodium tartrate, boric acid, ammonium borate, ammonium oxalate, ammonium citrate, maleic acid, malonic acid, phthalic acid, and citric acid.

In one embodiment, step (db2) is performed in an acidic aqueous solution with a concentration of not more than 0.1 mol/L. In step (db2), a low-concentration acidic aqueous solution which has a sufficiently small aluminum oxide solubility may be used. For example, a phosphoric acid aqueous solution with a concentration of not more than 0.1 mol/L may be used.

An antireflection film fabrication method of the present invention includes the steps of: providing any of the above-described molds and a work; and irradiating a UV-curable resin provided between the mold and a surface of the work with ultraviolet light supplied through the mold, thereby curing the UV-curable resin.

Advantageous Effects of Invention

According to the present invention, a method of fabricating a large-surface motheye mold which is capable of transmitting ultraviolet light is provided. According to the present invention, a novel motheye mold which is capable of transmitting ultraviolet light can be provided. According to the present invention, a method of fabricating an antireflection film with the use of the above mold is provided. The present invention is advantageous in that a large-surface motheye mold can be fabricated and is, however, as a matter of course, applicable to fabrication of a small-surface motheye mold.

DESCRIPTION OF EMBODIMENTS

Hereinafter, a motheye mold, a method of fabricating a motheye mold, and a method of fabricating an antireflection film using the mold according to an embodiment of the present invention are described with reference to the drawings.

First, problems which occur in anodization of an aluminum film formed over a base according to a conventional fabrication method are described with reference to FIGS. 1(a) and 1(b). The present inventor performed an experiment which is described below.

As the base which is capable of transmitting ultraviolet light, two glass substrates 10b of different sizes, a 5 cm square piece and a 10 cm square piece, were provided. On the glass substrates 10b, a 1.0 µm thick aluminum film 10a was deposited by sputtering. The resultant pieces are referred to as "samples 10".

Figure 1:
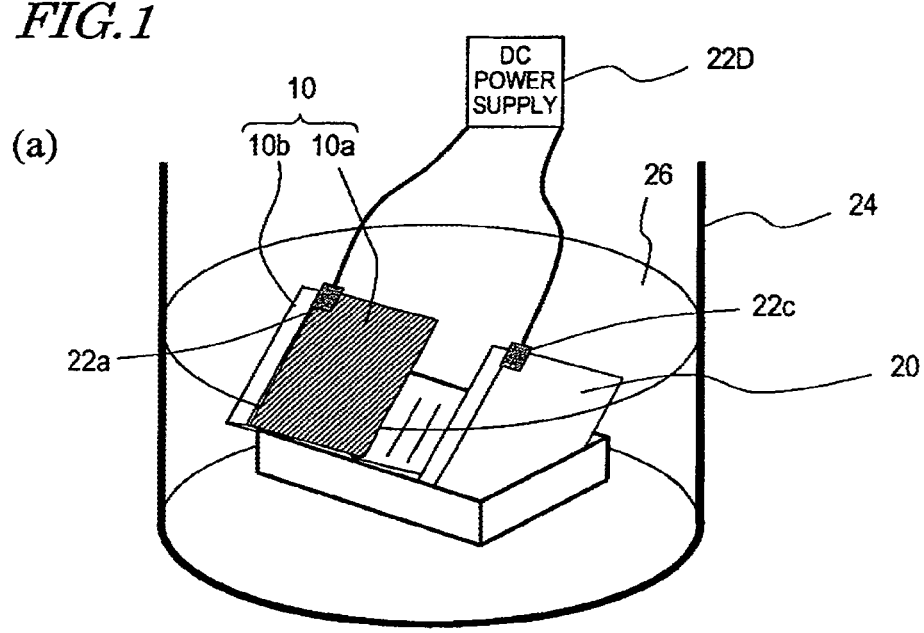
FIGS. 1 (a) and (b) are schematic diagrams for illustrating disadvantages of a conventional anodization step.
Figure 1:
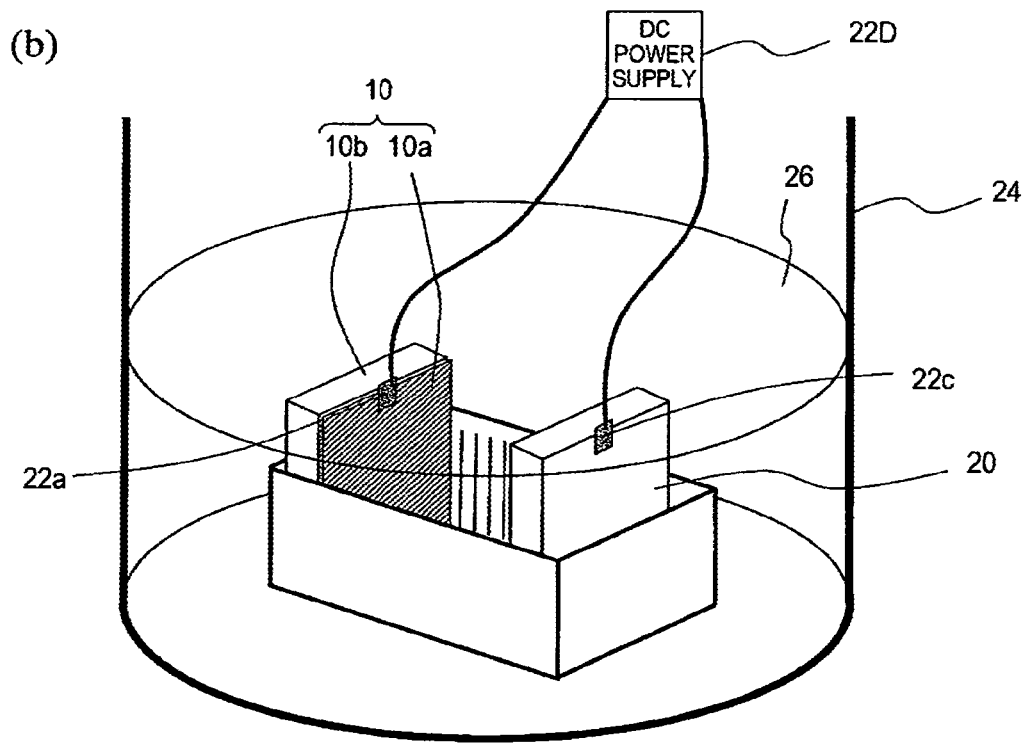

The anodization step was performed with the samples 10, including a 5 cm square piece and a 10 cm square piece, being immersed in an electrolytic solution 26 in a container 24 as shown in FIGS. 1(a) and 1(b), respectively. The 5 cm square piece sample 10 was held standing by a plastic jig such that a diagonal direction of the sample 10 was identical with the vertical direction as shown in FIG. 1(a). On the other hand, the 10 cm square piece sample 10 was held standing by a plastic jig such that a pair of opposite sides of the sample 10 were identical with the vertical direction as shown in FIG. 1(b). In either unit, an electrode 22a that was in contact with the aluminum film 10a was coupled to the positive electrode of an external DC power supply 22D via a lead wire. The negative electrode used in the anodization step was a platinum-plated tantalum plate 20 which had approximately the same size as either sample 10. An electrode 22c that was in contact with the tantalum plate 20 was coupled to the negative electrode of the external DC power supply 22D via another lead wire. The electrolytic solution 26 used herein was a 0.6 mass % oxalic aqueous solution at 5° C. The anodization was performed with an applied voltage at 90 V for 25 seconds. Thereafter, the sample was immersed in a 10 mass % phosphoric acid aqueous solution at 30° C. for 25 minutes, whereby the porous alumina layer obtained by the anodization was etched. This etching was performed to enlarge very small recessed portions of the porous alumina layer. The above-described anodization step and etching step were alternately performed through 5 cycles (including 5 cycles of the anodization step and 4 cycles of the etching step). The results are as described below.

It was visually confirmed that both the 5 cm square sample 10 and the 10 cm square sample 10 became transparent in large part by anodization. In the 5 cm square sample 10, somewhat non-transparent portions were remaining near the vertexes at the corners of the electrode 22a. In the 10 cm square sample 10, a somewhat non-transparent portion was remaining at the central portion of the sample 10. It was understood from this result that, when an aluminum film 10a deposited on a glass substrate 10b which is at least greater than the 5 cm square is anodized to form a light-transmitting mold, it is difficult to make the aluminum film uniformly transparent over the entire surface of the mold. Specifically, the aluminum film 10a can be completely anodized near the electrode 22a, but however, the anodized aluminum (alumina) does not have electrical conductivity, so that a portion which is distant from the electrode 22a by about 7 cm or more is electrically disconnected from the external DC power supply 22D. In this portion, the anodization does not advance, so that the aluminum film remains. Note that the same result was obtained from another sample which only underwent the anodization step.

Figure 2:
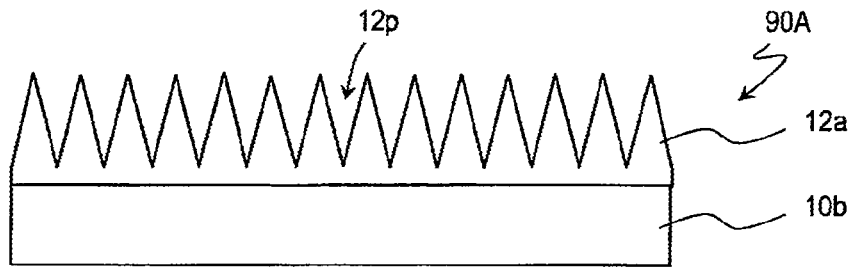
FIGS. 2 (a) and (b) are schematic diagrams of cross sections of a motheye mold obtained according to a conventional anodization method and SEM images of the cross sections. (a) shows a cross-sectional structure of a portion 90A in which an aluminum film was completely anodized. (b) shows a cross-sectional structure of a portion 90B in which part of the aluminum film was remaining.
Figure 2:
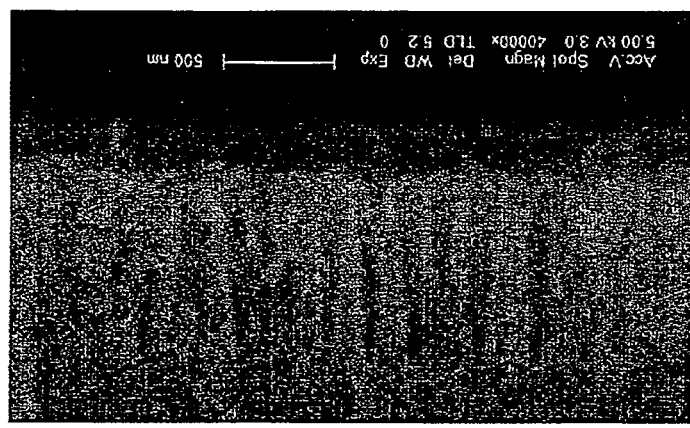
Figure 2:
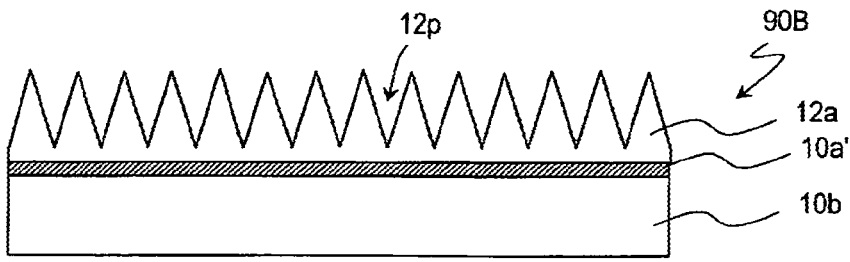
Figure 2:
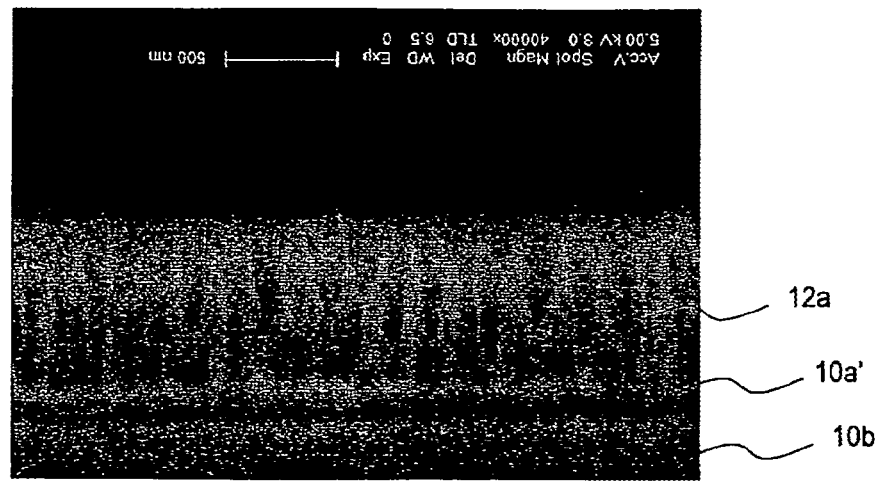

Of the 5 cm square sample 10, a portion in which the aluminum film 10a was completely anodized (transparent portion 90A) is cross-sectionally shown in FIG. 2(a), and another portion in which part of the aluminum film 10a was remaining (non-transparent portion 90B) is cross-sectionally shown in FIG. 2(b). In each of the FIGS. 2(a) and 2(b), a schematic cross-sectional diagram and a SEM image of the cross section are shown together.

As seen from FIG. 2(a), in the transparent portion 90A, the aluminum film 10a was completely anodized so that a porous alumina layer 12a having a plurality of very small recessed portions 12p abutted on the glass substrate 10b. Here, in order to form an antireflection film which has an excellent antireflection characteristic, it is preferred that the very small recessed portions 12p of the mold have a two-dimensional size of not less than 10 nm and less than 500 nm when viewed in a direction normal to the surface and that the distance between adjacent ones of the recessed portions is not less than 30 nm and less than 600 nm (see Patent Documents 1, 2 and 4). The recessed portions 12p of the porous alumina layer 12a formed herein have such dimensions that, for example, the diameter of the opening is 100 nm to 200 nm, the depth is 900 nm to 1 μm, and the distance between adjacent ones of the recessed portions 12p is 150 nm to 250 nm.

On the other hand, as seen from FIG. 2(b), in the non-transparent portion 90B, the aluminum film 10a' was remaining between the porous alumina layer 12a and the glass substrate 10b. Thus, it was confirmed that the aluminum film 10a' was remaining in the non-transparent portion.

Figure 3:
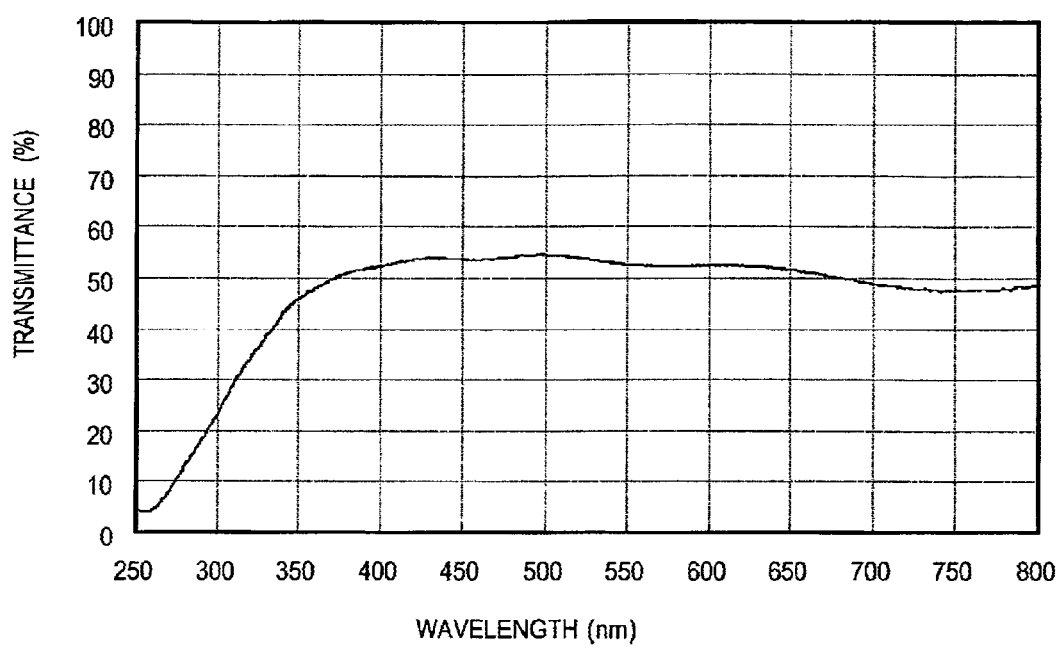
FIG. 3 A graph showing the transmission spectrum of the portion 90A of the motheye mold shown in FIG. 2(a).

FIG. 3 shows the transmission spectrum of the portion 90A of the motheye mold shown in FIG. 2(a). It can be seen that the transmittance is approximately 50% over the entire wavelength range of visible light (λ=380 nm to 780 nm) and that the transmittance for i-line (365 nm) that is usually used in polymerization of the UV-curable resin is also about 50%.

Next, a method of fabricating a motheye mold according to an embodiment of the present invention is described with reference to FIGS. 4(a) to 4(c).

Figure 4:
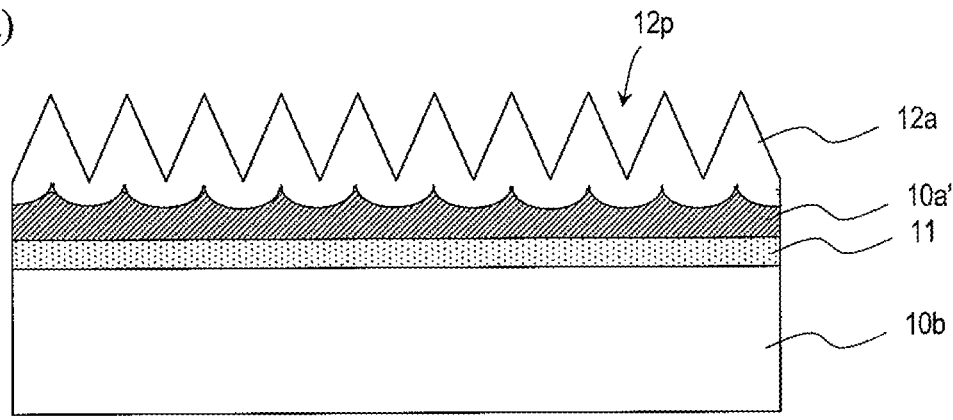
FIG. 4 (a) to (c) are schematic diagrams for illustrating a method of fabricating a motheye mold according to an embodiment of the present invention.
Figure 4:
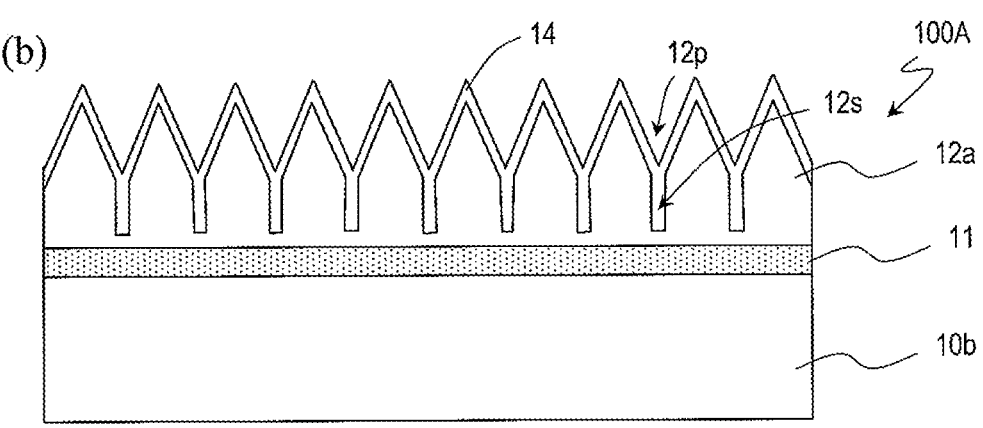
Figure 4:
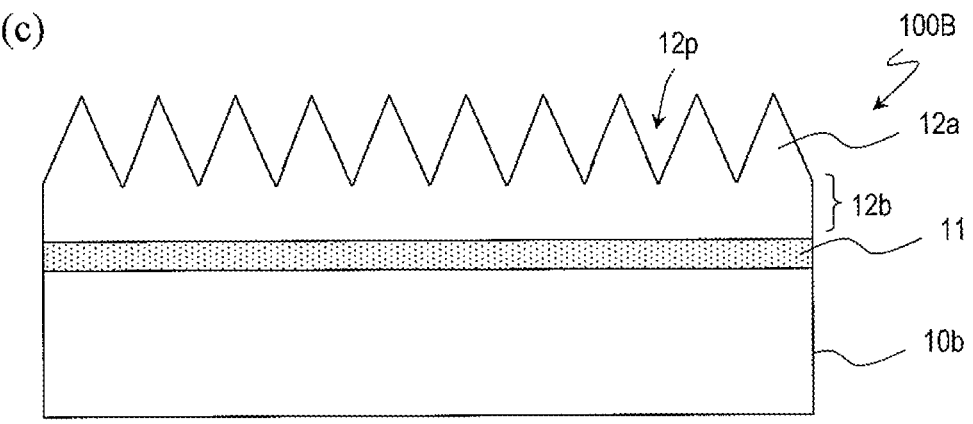

In the present embodiment, to form a motheye mold (or anodized porous alumina layer) with a large surface, which is for example 5 cm square or larger, i.e., to completely anodize an aluminum film, a conductive layer 11 is provided over the glass substrate 10b as shown in FIG. 4(a). The conductive layer 11 used herein is capable of transmitting at least 10% of ultraviolet light (365 nm) supplied for the purpose of curing a UV-curable resin. As a matter of course, the transmittance of a mold finally obtained is preferably not less than 10%, more preferably not less than 40%.

Here, as the conductive layer 11, a 20 nm thick titanium film was used. The titanium film was formed by sputtering. The thickness of the titanium film may be not less than 1 nm and not more than 100 nm. If the thickness of the titanium film is less than 1 nm, uniform conductivity may not be ensured. If the thickness of the titanium film exceeds 100 nm, the transmittance may be less than 10%.

The material for the conductive layer 11 is preferably titanium. Other possible examples include an ITO film and an IZO film which are known as transparent conductive films, although these are less preferable in terms of etching durability. A molybdenum film and a tungsten film are superior to the ITO film and the IZO film in terms of etching durability but may undergo formation of pits in the surface by etching. Thus, titanium is most preferable.

First, to form an inverted motheye structure (porous alumina layer), anodization and etching were alternately repeated. Specifically, the anodization was performed for 25 seconds with the applied voltage at 80 V using a 0.6 mass % oxalic aqueous solution at 5° C. Thereafter, the etching was performed by immersing the resultant structure in a 10 mass % phosphoric acid aqueous solution at 30° C. for 25 minutes. This etching was to enlarge very small recessed portions formed in the porous alumina layer in the preceding anodization step. The above-described anodization step and etching step are alternately performed, for example, each step performed twice, whereby a porous alumina layer 12a which has very small recessed portions 12p, i.e., which has an inverted motheye structure in its surface, is formed as shown in FIG. 4(a). However, with only these steps, the aluminum film 10a' may be remaining.

The resultant structure, including the remaining aluminum film 10a', was then anodized using a 0.6 mass % oxalic aqueous solution at 5° C. with the applied voltage at 80 V till the entire mold became transparent. As a result, a mold 100A was obtained, the cross-sectional structure of which is schematically shown in FIG. 4(b). Specifically, by performing another cycle of the anodization after formation of the inverted motheye structure in the surface, minute pores 12s that are smaller than the plurality of recessed portions 12p are formed at a side of the porous alumina layer 12a which is closer to the conductive layer 11 as shown in FIG. 4(b). (The two-dimensional size of the recessed portions 12p is not less than 10 nm and less than 500 nm, and the distance between adjacent ones of the recessed portions 12p is not less than 30 nm and less than 600 nm.)

The mold 100A shown in FIG. 4(b) includes the glass substrate 10b, the conductive layer (titanium film) 11 provided on the glass substrate 10b, and the anodized film (porous alumina layer) 12a provided on the conductive layer 11, but does not have a remaining aluminum film between the conductive layer 11 and the porous alumina layer 12a. Note that the porous alumina layer 12a shown in FIG. 4(b) has the linear minute pores 12s that are smaller than the recessed portions 12p that constitute the motheye structure on the side that is closer to the conductive layer 11, and therefore, the cross-sectional structure of the porous alumina layer 12a of the mold 100A looks as if a plurality of pencils (with pointed tips) were arranged.

Figure 8:
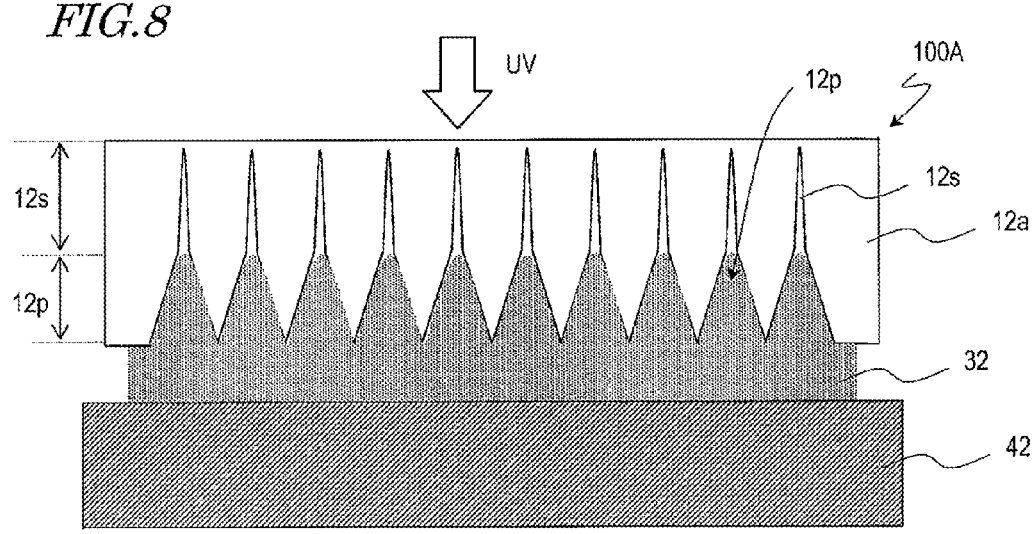
FIG. 8 A schematic cross-sectional view for illustrating the step of forming an antireflection film with the use of a motheye mold 100A.

When an antireflection film is formed using the mold 100A, the shape of the minute pores 12s may be transferred to the film. To prevent this problem, for example, forming a mold release layer 14 of a water-repellent resin (e.g., fluorine resin) is preferred. A preferred example of the fluorine resin is an amorphous fluorine resin (AF grade: AF1600) manufactured by DU PONT-MITSUI FLUOROCHEMICALS COMPANY, LTD. The mold release layer 14 may be formed by applying the fluorine resin by spin coating, for example. By providing the mold release layer 14, the transfer of the minute pores 12s to the antireflection film such as shown in FIG. 8 can be prevented.

The minute pores 12s of the porous alumina layer 12a of the mold 100A can be filled up according to the method described below.

As described above, after formation of the mold 100A shown in FIG. 4(b), the mold 100A is anodized in a neutral electrolytic solution (pH being more than 3.0 but less than 8.0), whereby the minute pores 12s can be filled up. Therefore, as a result of anodization in the above-described electrolytic solution, an alumina layer 12b that does not have the minute pores 12s, which is also referred to as "barrier layer", can be formed on a side of the porous alumina layer 12a which is closer to the conductive layer 11 as shown in FIG. 4(c). Note that the pH of the neutral electrolytic solution is preferably more than 4.0 and not more than 7.0.

The electrolytic solution is preferably an aqueous solution which contains at least one of acids or salts selected from a group consisting of tartaric acid, ammonium tartrate, potassium sodium tartrate, boric acid, ammonium borate, ammonium oxalate, ammonium citrate, maleic acid, malonic acid, phthalic acid, and citric acid.

The above electrolytic solution may be replaced by an acidic aqueous solution with a concentration of not more than 0.1 mol/L (liter), which has a sufficiently small aluminum oxide solubility. For example, a phosphoric acid aqueous solution with a concentration of not more than 0.1 mol/L may be used.

Figure 5:
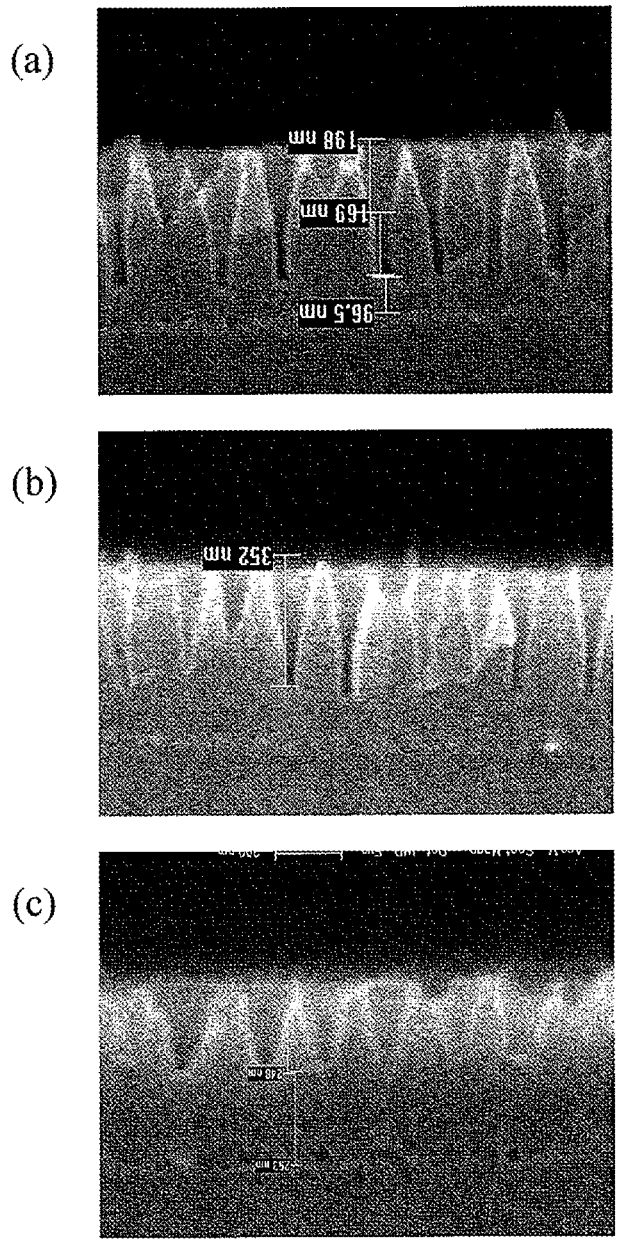
FIG. 5 (a) to (c) are SEM images of a cross section of the motheye mold, which demonstrate that a barrier layer is formed by anodization in a neutral solution.

FIGS. 5(a) to 5(c) illustrate the process of filling up the minute pores 12s by performing anodization with the use of, for example, ammonium tartrate (concentration: 0.1 mol/L, pH 6.5, solution temperature: 23.2° C.) as the neutral electrolytic solution. FIGS. 5(a) to 5(c) are SEM images of a cross section of a motheye mold, which demonstrate that the barrier layer 12b (FIG. 4(c)) is formed by anodization in the neutral solution.

An anodized film (having the minute pores 12s shown in FIG. 4(b)) which was obtained by alternately performing the anodization step and the etching step, each step performed four times, to form a motheye structure and further performing anodization (under the same conditions as those established in the anodization step for formation of the motheye structure) till the entire mold became transparent as described above was anodized for 180 seconds with the applied voltage at 100 V with the use of the above-described neutral electrolytic solution, whereby part of the minute pores was filled so that a 96.5 nm thick barrier layer was formed as shown in FIG. 5(a). Then, the anodized film shown in FIG. 5(a) was further anodized for 180 seconds with the applied voltage at 100 V with the use of the above-described neutral electrolytic solution, whereby the minute pores were further filled so that the thickness of the barrier layer was increased to 140 nm as shown in FIG. 5(b). Then, the film was further anodized for 180 seconds with the applied voltage at 200 V, whereby the thickness of the barrier layer was increased to 253 nm as shown in FIG. 5(c).

Figure 6:
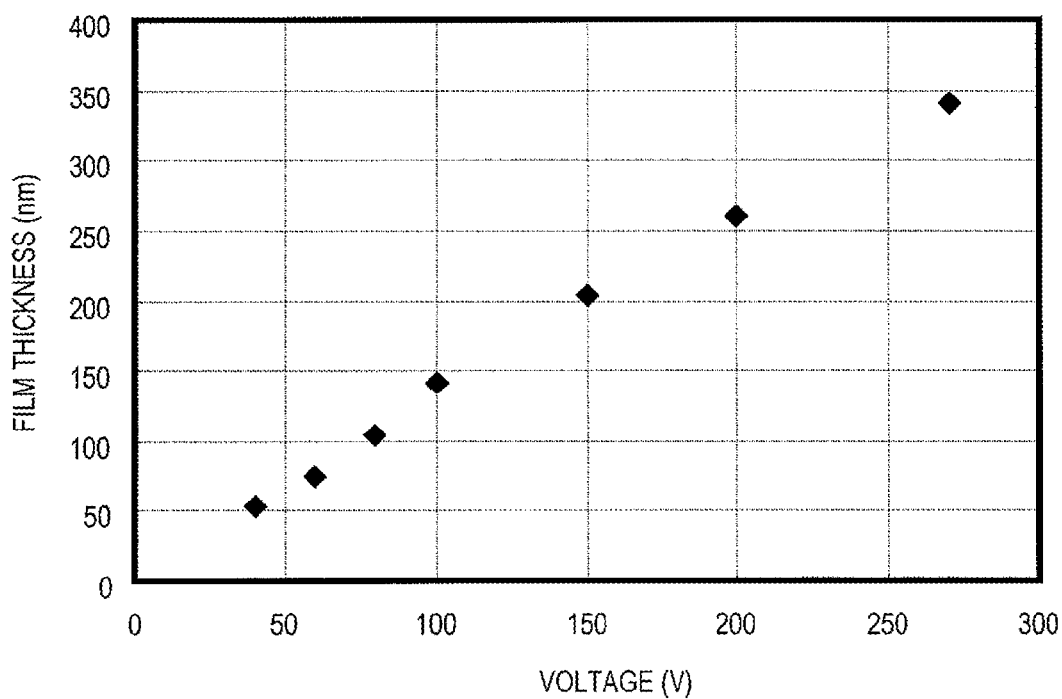
FIG. 6 A graph showing the relationship between the thickness of the barrier layer formed by anodization in an ammonium tartrate solution and the applied voltage.

The thickness of the barrier layer obtained by anodization with the use of the neutral electrolytic solution depends on the applied voltage. As for the neutral electrolytic solution, the result shown in FIG. 6 was obtained.

To obtain an antireflection film which has an excellent antireflection characteristic, the depth of the recessed portions 12p of the porous alumina layer 12a which constitute the motheye structure is preferably not less than 150 nm and not more than 500 nm. On the other hand, to avoid application of a high voltage (e.g., higher than 200 V) in the anodization step, the thickness of the barrier layer 12b is preferably more than 0 nm and not more than 400 nm. To fill up the minute pores in about two minutes with the applied voltage at 100 V, the thickness of the initial aluminum film 10a is preferably about 500 nm. From the viewpoint of limiting the thickness of the barrier layer 12b to the above condition, the thickness of the initial aluminum film 10a is preferably not more than 900 μm.

Figure 7:
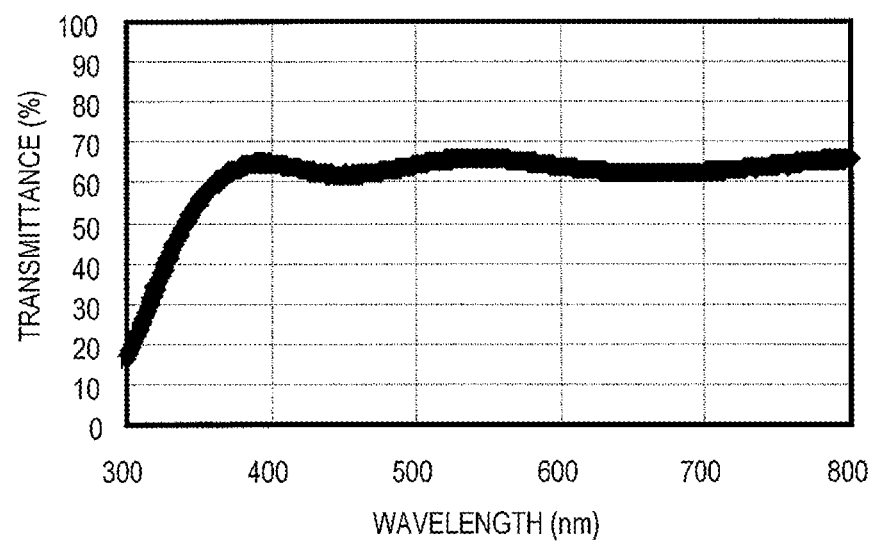
FIG. 7 A graph showing the transmission spectrum of a motheye mold fabricated according to a fabrication method of an embodiment of the present invention.

FIG. 7 shows the transmission spectrum of a mold 100B. As clearly seen from FIG. 7, the mold 100B has a transmittance of about 60% over the ultraviolet range around 365 nm and the entire visible light wavelength range. As for the mold 100A, a similar transmission spectrum was obtained. As seen from the comparison of the transmission spectrum of FIG. 7 and the transmission spectrum of FIG. 3, the transmittance of the mold 100B is higher than that of the motheye mold portion 90A (FIG. 2(a)). The reason for this result is not yet confirmed. However, the reason is probably that the configuration where the motheye structure is provided on the glass substrate with an alumina oxide layer which does not have minute pores (barrier layer) interposed therebetween causes smaller scattering and/or reduced reflection at the interface, as compared to the configuration where the motheye structure is directly provided on the glass substrate (mold 90A).

Next, a method of fabricating an antireflection film according to an embodiment of the present invention is described with reference to FIG. 8 and FIG. 9.

Figure 9:
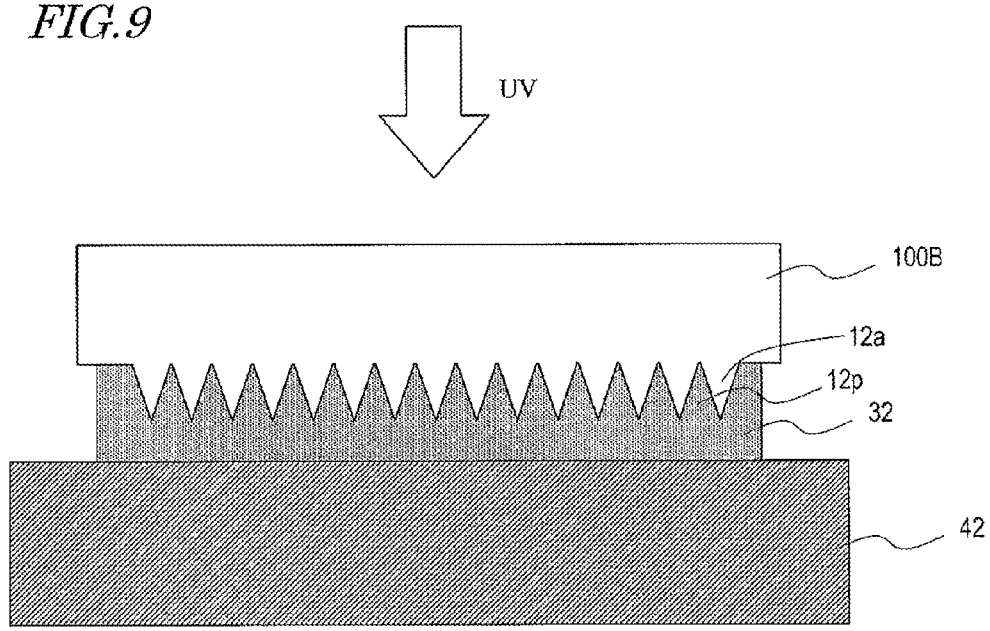
FIG. 9 A schematic cross-sectional view for illustrating the step of forming an antireflection film with the use of a motheye mold 100B.

The mold 100A or 100B is prepared as shown in FIG. 8 or FIG. 9.

A UV-curable resin 32 provided between the surface of a work 42 and the mold 100A or 100B is irradiated with ultraviolet light (UV) supplied through the mold 100A or 100B, whereby the UV-curable resin 32 is cured. The UV-curable resin 32 may be applied to the surface of the work 42 or, alternatively, may be applied to the mold surface of the mold 100A or 100B (a surface which has the motheye structure). As the UV-curable resin 32, an acrylic resin, for example, may be used.

When the mold 100A or 100B of the embodiment of the present invention is used, an antireflection film can readily be formed on, for example, the surface of a conventional polarizer.

Figure 10:
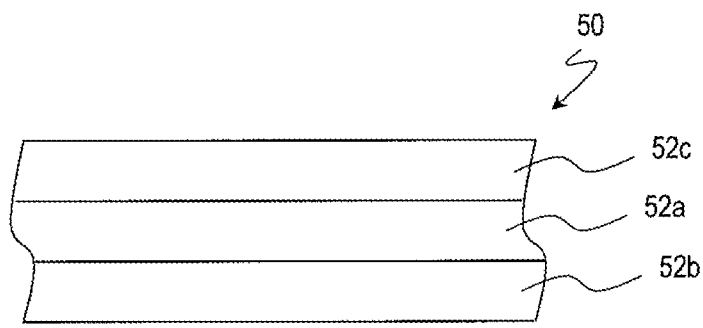
FIG. 10 (a) is a schematic diagram showing a cross-sectional structure of a polarizer. (b) is a schematic diagram showing a cross-sectional structure of a polarizer on which an antireflection film is formed according to an antireflection film fabrication method of an embodiment of the present invention.
Figure 10:
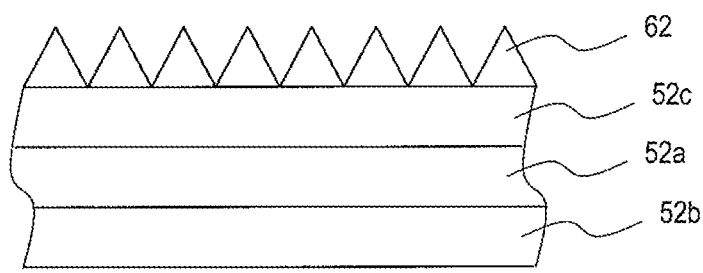

A polarizer 50 shown in FIG. 10(a) includes a polarizing layer 52a which is made of PVA and protector layers 52b and 52c between which the polarizing layer 52a is interposed. The protector layers 52c and 52b are made of, for example, COP (cycloolefin polymer) or TAC. To protect the polarizing layer 52a from ultraviolet light, at least one of the protector layers 52c and 52b has the property of absorbing ultraviolet light.

Therefore, in the ultraviolet irradiation for formation of the antireflection film on the polarizer 50, ultraviolet light cannot be supplied from the polarizer 50 side. When the mold 100A or 100B of the embodiment of the present invention is used, ultraviolet light can be supplied through the mold. Therefore, an antireflection film 62 which has a motheye structure can be formed on the polarizer 50 as shown in FIG. 10(b).

INDUSTRIAL APPLICABILITY

The present invention is widely applicable to formation of an antireflection film. The antireflection film is applicable to various uses of which antireflection is demanded, typically to optical elements for use in display devices or the like.

REFERENCE SIGNS LIST 10 sample
10b substrate (glass substrate)
10a aluminum film
10a' remaining aluminum film
11 conductive layer
12a anodized film (porous alumina layer)
12b barrier layer
12p recessed portions (inverted motheye structure)

12s minute pores
14 mold release layer
100A, 100B motheye mold

The invention claimed is:

1. A method of fabricating a mold that has an inverted motheye structure in its surface, the inverted motheye structure having a plurality of recessed portions whose two-dimensional size viewed in a direction normal to the surface is not less than 10 nm and less than 500 nm, the method comprising:
- (a) providing a base capable of transmitting ultraviolet light;
- (b) forming, on the base, a conductive layer capable of transmitting ultraviolet light;
- (c) depositing an aluminum film on the conductive layer; and
- (d) anodizing an entirety of the aluminum film, step (d) including
  - (d1) anodizing the aluminum film to form a porous alumina layer which has a plurality of very small recessed portions,
  - (d2) after step (d1), bringing the porous alumina layer into contact with an etchant, thereby enlarging the plurality of very small recessed portions of the porous alumina layer,
  - (d3) after step (d2), further anodizing the aluminum film to grow the plurality of very small recessed portions,
  - (da) forming the inverted motheye structure in a surface of the porous alumina layer through steps (d1) to (d3), and
  - (db1) after step (da), further anodizing the aluminum film to form minute pores on a side of the porous alumina layer which is closer to the conductive layer, the minute pores being smaller than the plurality of recessed portions;
  - (db2) after step (db1), anodizing the aluminum film to form an alumina layer which does not have the minute pores on a side of the porous alumina layer which is closer to the conductive layer; and
- wherein the thickness of the alumina layer which does not have the minute pores after step (db2) is more than the thickness of an alumina layer which does not have the minute pores after the step (db1).

2. The method of claim 1, wherein step (d) includes, after step (d3), further performing step (d2) and step (d3).

3. The method of claim 1, wherein the step (db2) is performed in an electrolytic solution whose pH is more than 4.0 and not more than 7.0.

4. The method of claim 3, wherein the electrolytic solution used in step (db2) is an aqueous solution which contains at least one of acids or salts selected from a group consisting of tartaric acid, ammonium tartrate, potassium sodium tartrate, boric acid, ammonium borate, ammonium oxalate, ammonium citrate, maleic acid, malonic acid, phthalic acid, and citric acid.

5. The method of claim 1, wherein step (db2) is performed in an acidic aqueous solution with a concentration of not more than 0.1 mol/L.

6. A method of fabricating an antireflection film, comprising:
- providing the mold as set forth in claim 1 and a work; and
- irradiating a UV-curable resin provided between the mold and a surface of the work with ultraviolet light supplied through the mold, thereby curing the UV-curable resin.

7. The method of claim 1, wherein the step (db2) comprises:
- filling the minute pores.

8. The method of claim 1, wherein the step (db1) comprises:
- anodizing the aluminum film until substantially the entire mold becomes transparent.

* * * * *